(12) United States Patent
Kannan et al.

(10) Patent No.: US 9,015,665 B2
(45) Date of Patent: Apr. 21, 2015

(54) GENERATING FUNCTIONAL ARTIFACTS FROM LOW LEVEL DESIGN DIAGRAMS

(75) Inventors: Kalapriya Kannan, Karnataka (IN); Anuradha Bhamidipaty, Bangalore (IN); Biplav Srivastava, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 12/268,697

(22) Filed: Nov. 11, 2008

(65) Prior Publication Data

US 2010/0122238 A1    May 13, 2010

(51) Int. Cl.
*G06F 9/44* (2006.01)

(52) U.S. Cl.
CPC ... *G06F 8/36* (2013.01); *G06F 8/10* (2013.01)

(58) Field of Classification Search
CPC ........................................................ G06F 8/75
See application file for complete search history.

(56) References Cited

U.S. PATENT DOCUMENTS

| | | | | |
|---|---|---|---|---|
| 6,427,230 | B1 * | 7/2002 | Goiffon et al. | 717/108 |
| 6,847,981 | B2 | 1/2005 | Song et al. | |
| 2003/0182470 | A1 * | 9/2003 | Carlson et al. | 709/328 |
| 2004/0093600 | A1 | 5/2004 | Takemura | |
| 2007/0156622 | A1 * | 7/2007 | Akkiraju et al. | 706/48 |
| 2009/0288068 | A1 * | 11/2009 | Gunsel et al. | 717/116 |
| 2011/0167070 | A1 * | 7/2011 | Ananthanarayanan et al. | 707/741 |

OTHER PUBLICATIONS

Yvan Labiche, Incremental Class Testing from a Class Test Order, Apr. 2005.*
Inaganti et al., Service Identification: BPM and SOA Handshake, BPTrends, Mar. 2007.
Greer, Service Oriented Architecture (SOA) Modeling Via Reuse of Service Components, Lockheed Martin, Aug. 15, 2006.
Arsanjani, Service-Oriented Modeling and Architecture, Nov. 9, 2004.
Hahn et al., Toward Very Large Terminological Knowledge Bases: A Case Study from Medicine, H. Hamilton and Q. Yang (Eds.): Canadian AI 2000, LNAI 1822, pp. 176-186, 2000.
Yang et al., Automatic Generation of Service Ontology From UML Diagrams for Semantic Web Services, R. Mizoguchi, Z. Shi, and F. Giunchiglia (Eds.): ASWC 2006, LNCS 4185, pp. 523-529, 2006.
Neighbors, Draco: A Method for Engineering Reusable Software Systems, Bayfront Technologies, Inc., May 1, 1987.
Kannan et al., Design Diagrams as Ontological Sources: Ontology Extraction and Utilization for Software Asset Reuse, the Semantic Web for Knowledge and Data Management: Technologies and Practices, IGI Publishers, 2008.

(Continued)

*Primary Examiner* — Li B Zhen
*Assistant Examiner* — Lenin Paulino
(74) *Attorney, Agent, or Firm* — Ryan, Mason & Lewis, LLP

(57) ABSTRACT

At least one design diagram is obtained from at least one previous software project. At least one service abstraction is extracted from the at least one design diagram. The at least one service abstraction is reused in a new software project. In another aspect, requirements are obtained for a current software project; at least one class diagram is obtained from at least one previous software project; a dependency graph is generated from the at least one design diagram, using link analysis; relationships between classes in the dependency graph are analyzed to obtain functional artifacts for the requirements; and the functional artifacts are reused in the new software project.

20 Claims, 14 Drawing Sheets

(56) References Cited

OTHER PUBLICATIONS

Ganci et al., Redpaper, Case Study: SOA Design Scenario, IBM Corp. 2008.

Hu et al., Aspect Mining from the Class Diagram in Program Comprehension, Journal of Xidian University, Aug. 2006, vol. 33, No. 4.

OMG Unified Modeling Language (OMA UML), Superstructure, V2.1.2., Nov. 2007.

OMG Unified Modeling Language (OMG UML), Infrastructure, V2.1.2, Nov. 2007.

Kannan et al., Promoting Reuse via Extraction of Domain Concepts and Abstractions from Design Diagrams, 2008 IEEE International Conference on Services Computing, Honolulu, Hawaii, Jul. 8-11, 2008.

IEE Inspec, Inspec Alerts, UML, Issue Jul. 2004, Nov. 29, 2004.

IBM developerWorks : Blogs : Tooling platforms and RESTful ramblings, http://www-128.com/developerworks/blogs/page/johnston?entry=more_on_modelin, downloaded Oct. 22, 2008, pp. 1-2.

IBM developerWorks : Blogs : Tooling platforms and RESTful ramblings, http://www-128.ibm.com/developerworks/blogs/page/johnston?entry=service_identificati, downloaded Oct. 22, 2008, pp. 1-8.

Zhang et al., Meta-Modeling Service-Oriented Architecture based on UML, Abstract, http://www.actapress.com/Abstract/aspx?paperId=27524, downloaded Oct. 22, 2008.

Miller, Service-Oriented Architecture Part 1: Identification, http://dn.codegear.com/print/30385, downloaded Oct. 22, 2008, pp. 1-4.

Zimmermann et al., Analysis and Design Techniques for Service-Oriented Development and Integration, IBM Deutschland, downloaded Oct. 22, 2008, pp. 1-6.

How to Identify, Specify, and Realize Services for your SOA, http:www.webservices.org/categories/enterprise/strategy_architecture/how_to_identify_downloaded Oct. 22, 2008, pp. 1-8.

OWL Web Ontology Language Overview, http://www.w3.org/TR/owl-features/ downloaded Oct. 22, 2008, pp. 1-13.

OWL-S: Semantic Markup for Web Services, http://www.w3.org/Submission/OWL-S/Overview.html downloaded Oct. 22, 2008, pp. 1-33.

Oberle et al., Developing and Managing Software Components in an Ontology-based Application Server, University of Karlsruhe, Germany downloaded Oct. 22, 2008, pp. 1-9.

Kietz et al., A Method for Semi-Automatic Ontology Acquisition from a Corporate Intranet, Swisslife Information Systems Research Lab, Zuerich, Switzerland downloaded Oct. 22, 2008, pp. 1-14.

Faure et al., First Experiments of Using Semantic Knowledge Learned by ASIUM for Information Extraction Task Using INTEX downloaded Oct. 22, 2008, pp. 1-6.

Happel et al., KOntoR: An Ontology-enabled Approach to Software Reuse, FZI Research Center for Information Technologies Research Group Infomration Process Engineering (IPE) downloaded Oct. 22, 2008, pp. 1-6.

Tichy et al., Seamless UML Support for Service-based Software Architectures, University of Paderborn, Germany downloaded Oct. 22, 2008, pp. 1-14.

Rothenberger, System Development with Systematic Software Reuse: an Empirical Analysis of Project Factors, Arizona State University, downloaded Oct. 22, 2008, pp. 1-6.

OMG Modeling and Metadata Specification, Catalog of OMG Modeling and Metadata Specifications, http://www.omg.org/technology/documents/modeling_spec_catalog_htm downloaded Oct. 22, 2008, pp. 1-12.

Introduction to UML 2 Sequence Diagrams, http://www.agilemodeling.com/artifacts/sequenceDiagram.htm downloaded Nov. 11, 2008, pp. 1-7.

Service, http://www.service-architecture.com/web-services/articles/service.html downloaded Nov. 11, 2008, pp. 1-3.

Data Mining—Wikipedia, http://en.wikipedia.org/wiki/Data_mining , downloaded Nov. 4, 2008, pp. 1-5.

Comment lines: Scott Simmons: Don't let the greatest benefits of SOA elude you, http://www.ibm.com/developerworks/websphere/techjournal/0706_col_simmons/0706_c downloaded Oct. 23, 2008, pp. 1-7.

Baundry et al., Testability Analysis of a UML Class Diagram downloaded Dec. 24, 2008, pp. 1-12.

Berendt et al., IT Systems Implementation, http://coltrane.wiwi.hu-berlin.de/lehre/2005w/isi/index.html 2005, pp. 1-5.

IBM developerWorks : Rational software developer resources, http://www.ibm.com/developerworks/rational downloaded Dec. 1, 2008, pp. 1-4.

IBM—Secure trade lane solution, http://www-01.ibm.com/software/solutions/LE/LG04-01/solutions_overview.html downloaded Dec. 1, 2008, pp. 1-12.

Bernhard, Automatic Acquisition of Semantic Relationships from Morphological Relatedness, T. Salakoski et al. (Eds.): FinTAL 2006, LNAI 4139, pp. 121-132, 2006.

Falkovych, Ontology Extraction from UML Diagrams, Amsterdam, Aug. 2002.

\* cited by examiner

"ENROLL A STUDENT IN A COURSE"

"DELETE A STUDENT IN A COURSE"

"BILL FOR SEMESTER IN A COURSE"

FIG. 7

SERVICE-CONSUMER PATTERN SERVICES

| SERVICE | OPERATIONS |
|---|---|
| ENROLL OR DELETE A COURSE | enrollStudent(aStudent) unregisterStudent(aStudent) |

CONSUMER-STORAGE PATTERN SERVICES

| SEQUENCE DIAGRAM | SERVICE | OPERATIONS |
|---|---|---|
| ENROLL SEQUENCE DIAGRAM | ENROLL A STUDENT IN A CLASS | enRoll(mydata) |
| BILL SEQUENCE DIAGRAM | BILL FOR SEMESTER | seeBill(mydata) |

USAGE PATTERN OVERLAP

|  | SERVICE CONSUMER | SERVICE PRODUCER | CONSUMER-STORAGE | REMARKS |
|---|---|---|---|---|
| SERVICE CONSUMER | X | X |  | USE SERVICE CONSUMER |
| SERVICE PRODUCER |  | X | X | USE SERVICE PRODUCER |
| CONSUMER-STORAGE | X | X | X | USE SERVICE CONSUMER AND PRODUCER |

SERVICE EXTRACTED BY THE ALGORITHM

| SERVICE NAME | OPERATIONS |
|---|---|
| CourseRegistration | enroll(mydata)<br>deleteacourse(mydata)<br>getCourseValidity(courseid) |
| Student | seeBill()<br>getCourse()<br>getSchedule()<br>OutputTranscripts(studentID) |
| Course | CourseOffering(courseID)<br>CourseSchedule(CourseID, studentId)<br>ViewCourseDetails(CourseID) |

SLT EVALUATION FOR THE SERVICES

| SLT CRITERIA | SERVICES | | |
| | CourseRegistration | STUDENT | COURSE |
|---|---|---|---|
| STATELESS | Y | Y | Y |
| DISCOVERABLE | Y | Y | Y |
| AUTONOMOUS | Y | Y | Y |
| LOOSELY COUPLED | Y | Y | Y |
| COMPOSABLE | Y | Y | Y |
| ABSTRACT | Y | Y | Y |

2002    2004    2006   2008

FIG. 12
SERVICE MODELED BY ARCHITECTS

| ARCHITECT 1 | | ARCHITECT 2 | |
|---|---|---|---|
| SERVICE NAME | OPERATIONS | SERVICE NAME | OPERATIONS |
| Register CourseService | Course getCourse (integer Year, String Season, String Department) Status RegisterCourse(String CourseId, String StudentId, Boolean IsRegular) getStatus(String CourseId) Status commitCourse(String CourseId, String ProfessorID) | Course RegistrationService | Registercourse (course, student) GetCourseSchedule(course) courseCancelRegister(student course) viewRegistration(studentid) |
| CourseStudent | Course getCourse(integer Year, StringSeason, StringDepartment) Student [] getStudents(StringCourseId) | Course | ViewCourseprereq(courseid) viewCoursedetails(courseid) |
| 2102 | 2104 | 2106 | 2108 |

FIG. 13
RESULTS FOR MATCHING SERVICES

| ARCHITECT 1 | | ARCHITECT 2 | |
|---|---|---|---|
| SERVICES | OPERATIONS | SERVICES | OPERATIONS |
| CourseRegistration | RegisterCourse | CourseRegistrationService | RegisterCourse, courseCancelregister |
| CourseStudent | Getcourse | NA | NA |
| 2202 | 2204 | 2206 | 2208 |

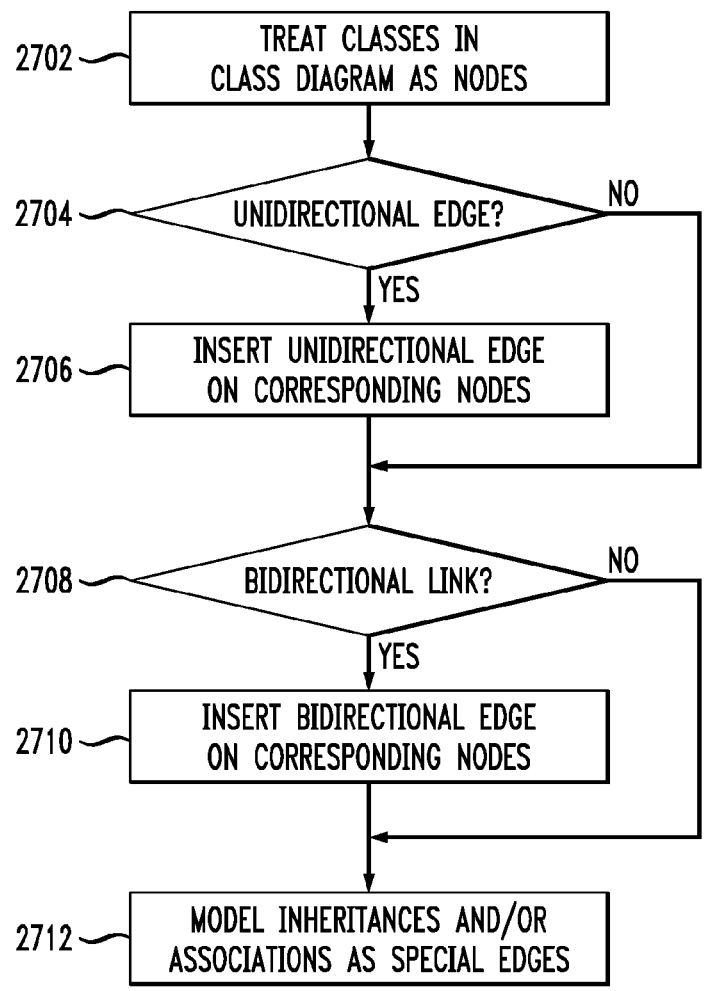
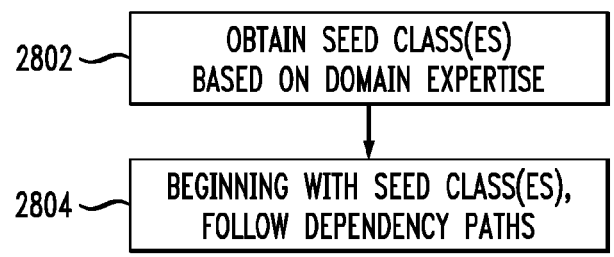

FIG. 20
CASE 1: NO OUTGOING LINK
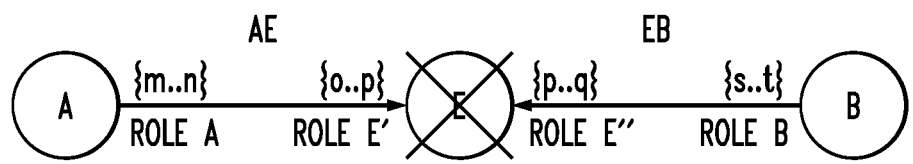
CASE 2: NO INCOMING LINK
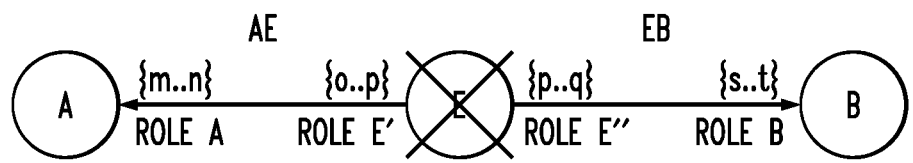
CASE 3: PROPAGATION EDGES, INCOMING LINK AND OUTGOING LINK
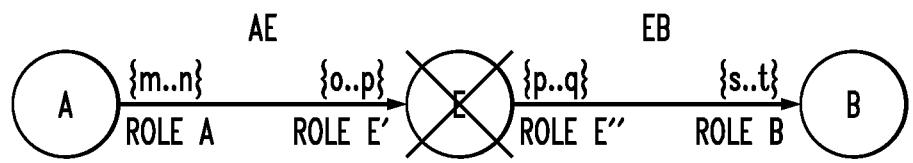
BOTH INCOMING AND OUTGOING LINKS IN CASE 3 CAN BE REPLACED BY BIDIRECTIONAL LINKS
E-ELIMINATED NODE

GENERATING FUNCTIONAL ARTIFACTS FROM LOW LEVEL DESIGN DIAGRAMS

FIELD OF THE INVENTION

The present invention relates to the electrical, electronic and computer arts, and, more particularly, to software development and the like.

BACKGROUND OF THE INVENTION

In custom software development projects, in general, the same type of software is being built for different customers. The deliverables are similar because they address the same market (e.g., telecommunications, banking, and so on) or have similar functions, or both. However, most organizations do not take advantage of this similarity and conduct each project from scratch, leading to lesser margins and lower quality.

Software reuse is a significant issue for a large part of the information technology (IT) business involved with the development of custom software solutions. Most organizations build software solutions for focused markets, also called business lines, verticals or domains, and they seek to grow their expertise with every project.

SUMMARY OF THE INVENTION

Principles of the invention provide techniques for generating functional artifacts from low level design diagrams. In one aspect, an exemplary method (which can be computer-implemented) includes the steps of obtaining at least one design diagram from at least one previous software project; extracting, from the at least one design diagram, at least one service abstraction; and reusing the at least one service abstraction in a new software project.

In another aspect, an exemplary method (which can be computer-implemented) includes the steps of obtaining requirements for a current software project; obtaining at least one class diagram from at least one previous software project; generating a dependency graph from the at least one design diagram, using link analysis; analyzing relationships between classes in the dependency graph to obtain functional artifacts for the requirements; and reusing the functional artifacts in the new software project.

One or more embodiments of the invention or elements thereof can be implemented in the form of a computer product including a tangible computer usable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more of the following technical benefits:

a) The Service information is explicitly represented after being extracted and stored in a usable format such as Uniform Modeling Language (UML); subsequently, it can be readily reused in new projects.

b) The development time of the projects can be significantly reduced when existing assets are reused instead of creating services from scratch.

c) The implementation artifacts can be obtained, given a services abstraction, in view of porting the functionality, given constraints of the target environment. For example, in view of porting the authentication functionality of banking software, the service abstraction defined as "Authentication" can be specified and the implementation artifacts related to authentication can be extracted and ported.

d) High reusability can be achieved, such that the target requires substantially less time to obtain the functional artifacts. Therefore it significantly increases the reusability and reduces the time spent in creating new projects.

e) Metrics from the service model being output, such as fan in and fan out presented in one or more embodiments of the invention, can be used to verify the correctness and accuracy of the models in the new project.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 7 presents a table of service-consumer pattern services;

FIG. 8 presents a table of consumer-storage pattern services;

FIG. 9 presents a table of usage pattern overlap;

FIG. 10 presents a table of services identified from the sequence diagrams;

FIG. 11 presents a table of extracted service extractions and associated metrics;

FIG. 12 presents a table comparing services modeled by two different experts;

FIG. 13 presents a table with results for matching services;

FIG. 18 shows exemplary generation of a dependency graph;

FIG. 19 shows exemplary analysis of relationships;

FIG. 20 shows elimination of a node and its dangling edges; and

DETAILED DESCRIPTION OF PREFERRED EMBODIMENTS

Systematic reuse of software artifacts has been an elusive goal for several years. Service-Oriented Architecture (SOA) has been touted in recent years due to its promise of fostering reuse. Even so, reuse with SOA continues to be limited. One major bottleneck hindering reuse has been the lack of formal techniques for extracting domain knowledge from existing reusable software assets. Aspects of the invention provide an approach that extracts the domain and service abstractions from design diagrams of existing software solutions and represents them in a form that can be reused in new projects. Design diagrams are an integral part of the software development process and therefore capture a large amount of domain information in the form of domain concepts and abstractions. The abstractions can be either directly used as services or can be used as seed services to model other high level services. Both domain and service abstractions are thus extracted through one or more inventive techniques, and promote reuse of software assets to a significant extent.

It will be appreciated that, in many cases, code is the most useful implementation artifact that, if reused, will significantly reduce the development time of projects. However, achieving code reuse is difficult, since requirements to code mapping, or capturing the intention of the requirements and the appropriate code, is quite infeasible with current techniques. Services are modular abstractions describing the inputs and outputs of a collection of related operations (functions) but without going into the details of how an operation is implemented. Accordingly, knowing about services in an implementation helps in understanding what the code "is about" and aids in better reuse of the code without going into details about the code itself. Furthermore, services provide a functional view, and a mapping between the service and its implementation can be achieved through mapping techniques. Services reusability is more clearly understood in terms of the functionality it provides.

In order to obtain an implementation view, in one or more embodiments, examine the diagrams that directly reflect the implementation aspects of a solution. Sequence and class diagrams are design diagrams that capture the intensions of the implementation in a diagrammatic method. In a similar manner, UML does not have service descriptions. Therefore, aspects of the invention present a representation of the output service description that is found. The service interfaces are specified in terms of Java interfaces. One or more embodiments of the invention provide a methodology where low level design diagrams, such as sequence diagrams or class diagrams, are examined, and wherein a methodology extracts service abstractions whose interfaces are specified in terms of Java interfaces.

Figure 1:
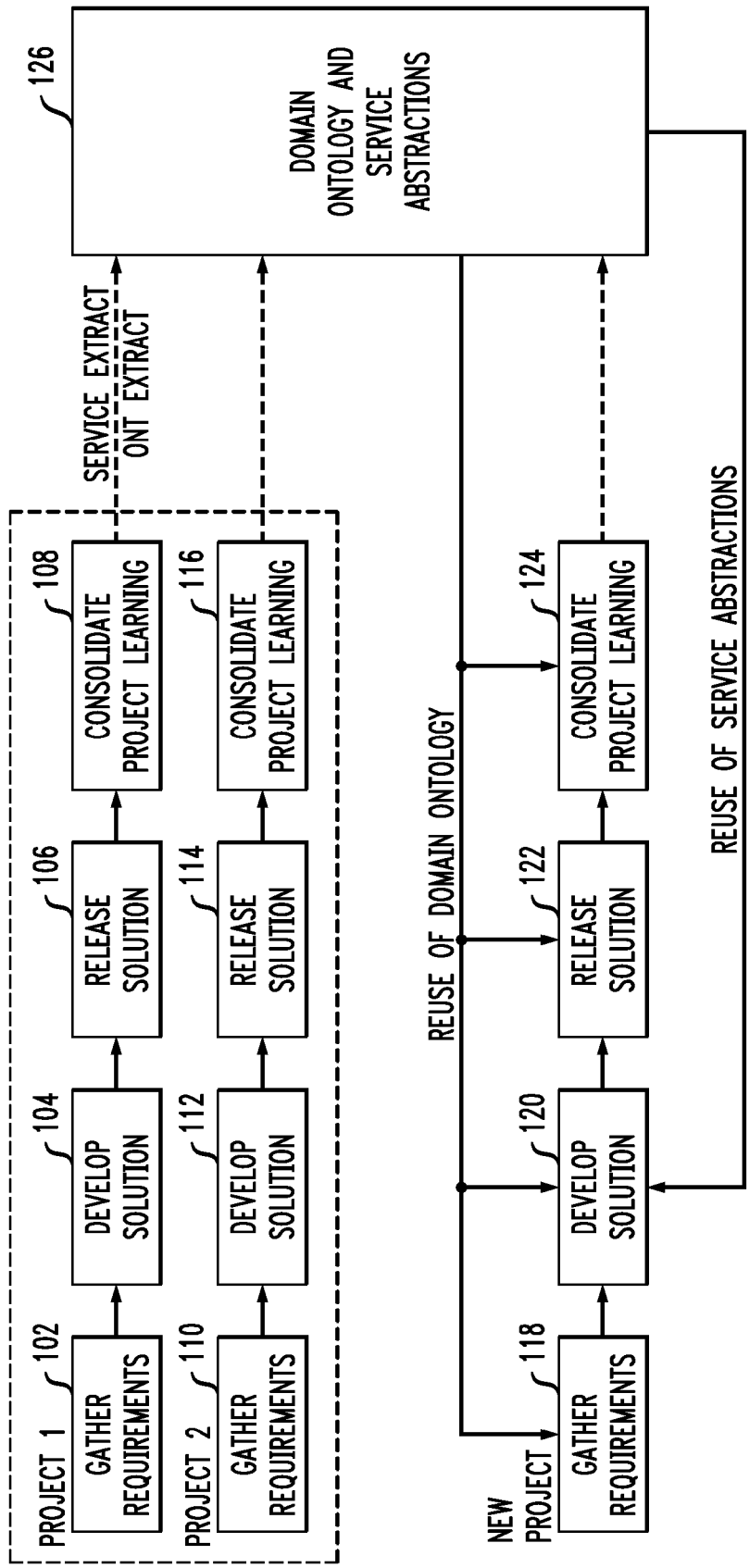
FIG. 1 shows exemplary custom software projects with reuse of domain ontology and service abstractions.

In FIG. 1, a simplified project cycle 100 is shown. The project requirements are collected, as indicated in blocks 102 and 110 for Project 1 and Project 2, respectively; the solution is developed and tested, as per blocks 104, 112; and finally released to the customer, as per blocks 106, 114. At the end of the project, a report is generated to capture the learning, as per blocks 108, 116. Heretofore, project-end deliverables or reports have typically not been explicitly used to improve the solution development process for new projects.

The similarity among the projects when extracted and represented makes the similarity across the projects explicit. However, manually creating such domain knowledge is infeasible due to efforts required for the training of the software professionals. Although many engineering tools have matured for years, acquisition of this knowledge remains a tedious task leading to domain knowledge acquisition bottlenecks. Design diagrams like UML are an integral part of software project deliverables, documenting significant facets of the solution, such as software artifacts, their relationships and runtime behavior. They are excellent sources of domain knowledge, especially the domain abstractions. In the world of SOA, these abstractions are typically referred to as services. In one or more embodiments of the invention, use is made of design diagrams to facilitate reuse of service abstractions. As shown in FIG. 1, services are extracted from blocks 108, 116 and are present in block 126, from which domain knowledge can be reused in steps 118, 120, 122, 124 of a new project, and from which service abstractions can be reused in, for example, step 120 of a new project.

Existing work in converting UML to domain and/or services transformation has assumed that all UML elements contain domain information, and has therefore resulted in notation conversion approaches. See K. Falkovych, Ontology Extraction from UML Diagrams, Master's thesis, Vrije Universiteit Amsterdam, August 2002 ("Falkovych"); Jin Yang, in Chung, Automatic Generation of Service Ontology from UML Diagrams for Semantic Web Services, The Semantic Web ASWC 2006 (2006), pp. 523-529 ("Yang"). Much, but not all, information in UML diagrams represents abstractions. Embodiments of the invention extract and explicitly represent them, to enable shared and common domain theories which foster reuse. Services of a system are dependent on the dynamic interaction of the classes. "ServiceExtract" is a method that uses dynamic interaction diagrams, such as sequence diagrams, to extract the services. Now, the extracted service abstractions can be utilized in new projects. The lower half of FIG. 1, with steps 118-124, shows their reuse.

One or more embodiments of the invention provide one or more of the following: (i) use of design diagrams as a good source of service abstractions, capturing similarity among software projects; (ii) techniques to extract service abstractions from diagrams, such as UML diagrams, from a project; (iii) reasonably accurate service extraction; and (iv) extracted service abstractions which assist software reuse. The aforementioned ServExtract can be implemented, by way of example and not limitation, as a plug-in using IBM® Rational® Software Architect, an advanced model-driven development tool available from International Business Machines Corporation of Armonk, N.Y., USA.

Hereinafter, a standard domain example of student course registration will be presented, as will ServExtract (a technique for extracting service abstractions) using UML diagrams. Information extracted in accordance with one or more embodiments of the invention is reusable and accurate.

UML is often used as both a requirements representation (by an analyst) for expressing customer needs and as a specification representation (by a developer) for documenting what the solution system will do. See UML 2 Modeling Language.

Service abstractions represent logical abstractions that provide high level functions. Services are logical entities that encompass sets of operations to achieve business goals. See OWL-S Semantic Markup for Web Services. In view, for example, of promoting reuse, embodiments of the invention extract and represent the service abstractions.

Reuse of software components (code, library), legacy software systems, and the like, among projects is addressed in Marcus A. Rothenberger, System Development with Systematic Software Reuse: an Empirical Analysis of Project Success Factors ("Rothenberger"); D. Oberle, A. Eberhard, S. Staab, and R. Volz, Developing and managing software components in an ontology-based application server, in 5th International Middleware Conference, LNCS, Springer, 2004; and Happel, H.-J., Korthaus, A., Seedorf, S., and Tomczyk, P., KOntoR: An Ontology-enabled Approach to Software Reuse, in: Proceedings of the 18$^{th}$ International Conference on Software Engineering and Knowledge Engineering (SEKE), San Francisco, July 2006. Embodiments of the invention use design diagrams as sources of knowledge such as domain ontology and service abstractions. This knowledge, when extracted and represented, aids software professionals during the various stages of the software development process.

Approaches that rely on pattern, association rule, conceptual pruning, ontology pruning, and concept learning have been used to extract domain knowledge. See, respectively, Morin, E. (1999) Automatic acquisition of semantic relations between terms, from technical corpora, Proc. Of the Fifth Int. Congress on Terminology and Knowledge Engineering (TKE-99), TermNet-Verlag, Vienna; Adriaans, P., Zantinge, D., (1996) Data Mining, Addison-Wesley, 1996; Faure, D., Poibeau, T. (2000) First experiments of using semantic knowledge learned by ASIUM for information extraction task using INTEX, in: S. Staab, A. Maedche, C. Nedellec, P. Wiemer-Hastings (eds.), Proceedings of the Workshop on Ontology Learning, 14th European Conference on Artificial Intelligence ECAI '00, Berlin, Germany; Kietz, J. U., Maedche, A., Volz, R. (2000) A Method for Semi-Automatic Ontology Acquisition from a Corporate Intranet, in: Aussenac-Gilles, N., Bibow, B., Szulman, S. (eds.) EKAW'00 Workshop on Ontologies and Texts, Juan-Les-Pins, France, CEUR Workshop Proceedings; and Hahn, U., Schulz, S., (2000) Towards Very Large Terminological Knowledge Bases: A Case Study from Medicine, in Canadian Conference on AI 2000: 176-186. There has been work that aims at using UML as a representation language for both ontology and services abstractions. See Falkovych and Yang. Aspects of the invention provide an extraction technique that combines a rule based approach with conceptual pruning. One or more embodiments of the invention, rather than concentrating on converting UML to a service or ontology representation language, instead aim at extracting pertinent information from UML diagrams.

Example Domain

Purely by way of example and not limitation, a case study of student course registration taken from the Rational tutorial will be employed as the running example in the exemplary embodiment. In this non-limiting example:

(a) Each semester, students may request a course catalogue containing a list of course offerings for the semester.

(b) The new on-line registration system will allow students to select four course offerings and two alternative choices for the coming semester.

(c) No course offering will have more than ten students and less than three students.

(d) Billing is done for each student for the courses registered.

(e) Professors must be able update their course offerings and see which students signed up.

Figure 2:
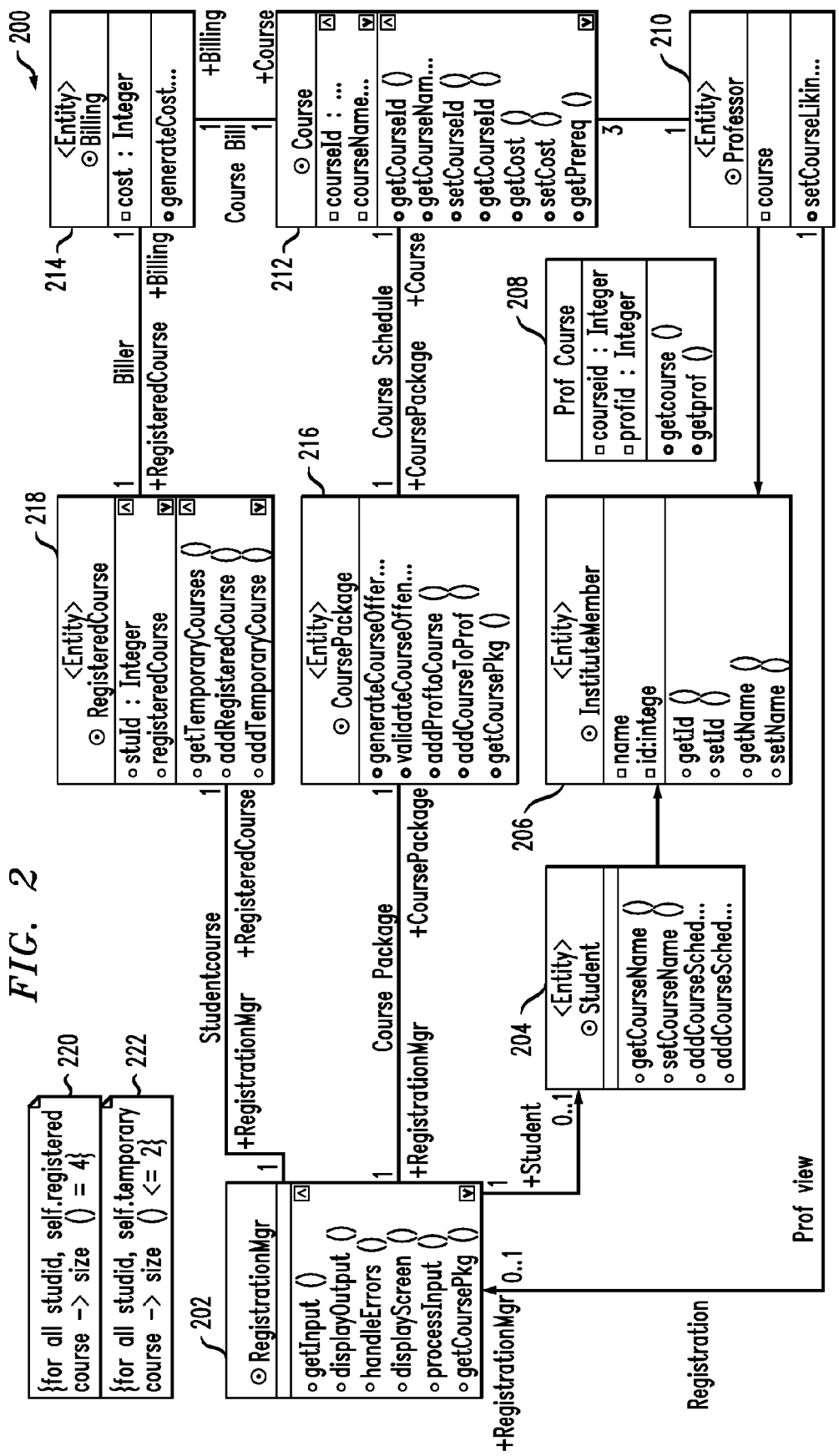
FIG. 2 shows implementation and environmental artifacts in a class diagram.

For the purpose of experimentation and evaluation, in this application, several solutions for the above problem are illustrated. FIG. 2 gives the UML class diagram 200 for an exemplary solution, henceforth referred to as "Solution A" (SolA). Again, purely for illustrative purposes, two other solutions (class diagrams), taken from the aforementioned tutorial website of Rational Software Corporation are also employed; these are referred to as "Solution B" (SolB) and "Solution C" (SolC) (class room lecture of Prof. Dr. Bettina Berendt). These input class diagrams are taken as correct, for purposes of illustrating one or more non-limiting embodiments of the invention.

Classes and associations between two classes are represented as nodes and edges, respectively. Following this notation, inheritance and an aggregation and/or composition relationship can be represented as a Directed Acyclic Graph (DAG). Such a relationship between two nodes A and B is represented as a directed edge between these nodes. Associations of the form "USING" are described as bidirectional and directed edges between the nodes in the representation graphs. The terms nodes and classes are used interchangeably herein, as are the terms edges and associations.

FIG. 2 includes registration manager 202, student entity 204, institute member entity 206, professor and course information 208, professor entity 210, course information 212, billing entity 214, course package entity 216, registered course entity 218, and exemplary code statements 220, 222. In block 218, stuId: Integer is an example of an attribute level implementation artifact. Block 202 is an example of a class level implementation artifact. The arrow between blocks 204 and 206 is an example of an environmental artifact.

Extracting Service Abstractions

An exemplary inventive system employs the UML diagrams and extracts Service Abstractions. Service abstractions capture significant functionalities that are offered by the interaction among domain concepts. ServiceExtract identifies them along with the implementation artifacts.

UML elements can be classified broadly as two categories:
(a) Implementation artifacts: They represent low level details of the solution, such as messages exchanged and their behavior. These artifacts can be full-fledged classes or specific attributes of a class.
(b) Environmental Artifacts: They include ontological entities and relationships, such as generalization (IS-A), aggregation/composition (HAS-A) and the "USING" association among entities. The interaction among the domain concepts in association with the implementation artifacts results in services (functionality).

Although all UML diagrams have domain knowledge, static information (such as concepts, relationships among them, and attributes) can be obtained from class diagrams. Services of a system are dependent on the dynamic interaction of the classes, and therefore ServiceExtract uses dynamic interaction diagrams, such as sequence diagrams, to extract the services. In view of providing a re-usable component, for each such service identified, an exemplary inventive system obtains the implementation artifacts from class diagrams.

Extraction of Service Abstractions

With the advent of Service Oriented Architectures (SOA), a more promising reusable component is a service. The domain analysis can be exploited to identify and design reusable service abstractions. Such service abstractions have significant reuse in a family of products designed in a domain. See James M. Neighbors, Draco: A method for engineering reusable software systems, in Software Reusability—Volume I: Concepts and Models, pages 275-294, 1989. Aspects of the invention extract these service abstractions from low level diagrams.

Two aspects of extracting services abstractions are addressed in one or more embodiments of the invention. In one aspect, both class diagram and sequence diagrams are used to generate services and their implementation artifacts. In another aspect, only class diagrams are considered and a service requirement in the form of the key work is taken as input. The services implementation artifacts are generated using other external sources and dependency analysis to generate the implementation artifacts of the services pertaining to the key word.

Figure 6:
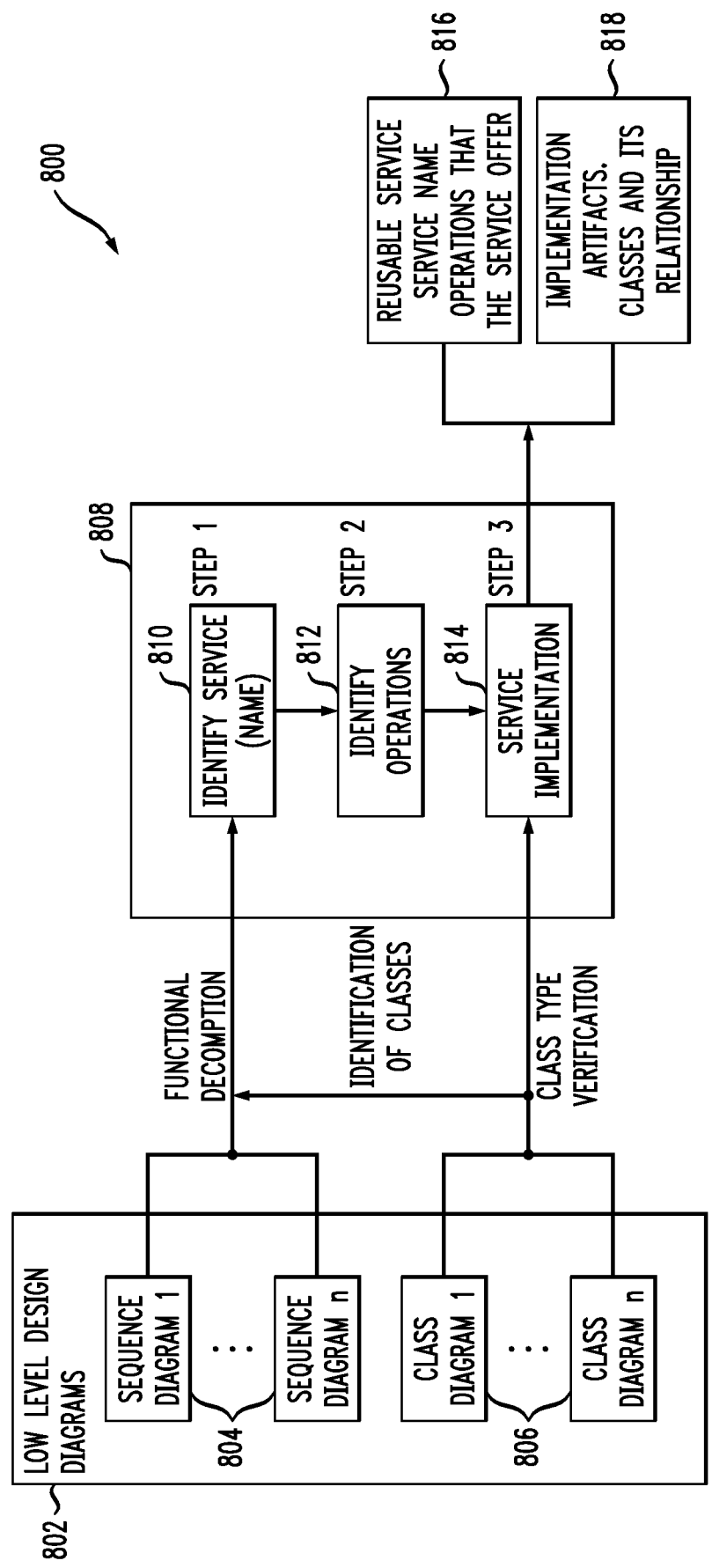
FIG. 6 depicts service extraction.

Services are traceable through diagrams representing dynamic interactions in the system. Interaction design diagrams, such as sequence diagrams, describe the services provided by objects through the exchange of messages. FIG. 6 gives an overview of the system architecture 800 for extracting logical domain abstractions. As a preprocessing step, class diagrams are used to verify and/or populate the stereotypes for the classes in the sequence diagram. The low level design diagrams 802 include sequence diagrams 1 to n, designated as 804, and class diagrams 1 to n, designated as 806. As shown at 808, ServiceExtract includes three major steps: step 810, identification of the name for the candidate service, step 812, obtaining the interfaces for the candidate services, and step 814, obtaining the implementation artifact for the candidate services. The reusable service name operations are listed in block 816 and the implementation artifacts that were obtained are listed in block 818. ServiceExtract is discussed hereinafter, in the context of both single and multiple sequence diagrams.

The term system is used herein to refer to a group of interacting, interrelated classes. (System is also used herein to refer to a computer system implementing one or more aspects of the invention; the skilled artisan will appreciate the intended meaning from the context). As a non-limiting running example, consider the sequence diagrams 500, 600, and 700 shown in FIGS. 3-5, for, respectively, the functionalities "Enroll a student in a course," "Delete a student in a course," and "Bill for semester." Elements in FIG. 3 analogous to those in FIG. 2 have received the same reference character incremented by three hundred, and will not be separately described. Similarly, elements in FIG. 4 analogous to those in FIG. 2 have received the same reference character incremented by four hundred; while elements in FIG. 5 analogous to those in FIG. 2 have received the same reference character incremented by five hundred.

Extraction From Single Sequence Diagram

Services are offered by the system (interaction of classes) to the outside world (user of the system). Sequence diagrams model the interaction between the system and the outside world. In a sequence diagram, an actor (outside element) interacts with the system through the boundary classes. The controller classes carry out the necessary action and use the entity classes to store and/or obtain information. As a sequence diagram provides a single atomic service, the service offering of a sequence diagram can be modeled as a service abstraction.

Figure 3:
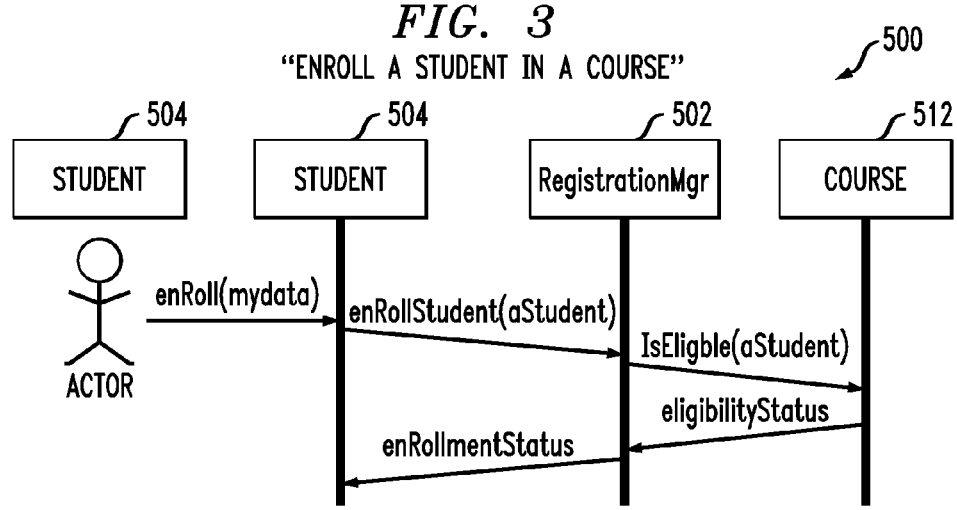
FIGS. 3-5 are sequence diagrams for, respectively, enrolling a student, deleting a student, and billing for a semester.

This can be illustrated through an example. FIG. 3 shows the sequence diagram of a student registering for a course. "Enroll a student in a course" is a function (at high level) provided by the system. This functionality is by itself a service in which the actor 'student' 504 interacts with the system. When a single sequence diagram is considered, the name of the sequence diagram can be directly used as the name of the service abstraction.

In order to identify the operations of the service abstraction, embodiments of the invention look at the pattern of interaction between the system and the user of the system (actor in this case). The actors interact with the system through the interfaces provided to the boundary class by the system. In other words, the system exposes its services through these interfaces. The interactions between the actor and the system can be categorized into two kinds. They are: (i) the "ACTS UPON" interaction and (ii) the "RESPONSE" interaction.

ACTS UPON interaction: The ACTS UPON interaction reflects the services offered by the system. The boundary class ACTS UPON the system through these interactions. The interfaces contributing to such interactions form the operations offered by the services.

RESPONSE interaction: The boundary class gets the RESPONSE from the system for the requested service through these interfaces In FIG. 3, the boundary class ACTS UPON the system through the interface "enroll Student(aStudent)". This interface forms the service interface. The other interaction "enrollmentStatus" is a response from the system to the boundary class. The response messages do not convey any information about the services provided by the system.

The implementation artifacts are all the classes that participate in achieving the functionality. In FIG. 3 student, courses, and RegistrationMgr are the classes involved in providing this functionality. These classes are preserved in the class diagram, along with the interactions among them. There might exist, between two classes, other classes (not part of the sequence diagram) that should be preserved. Such classes are eliminated and the relationships are propagated using the following method of propagation. In a class diagram when classes are removed relationships between the remaining classes should be preserved. Embodiments of the invention preserve this relationship by the process of propagation. Propagation results in new relationship (edges) among neighbors. The properties of the new relationship depend on the properties of two dangling edges that result in propagation. FIG. 20 shows the nature of edges that are atypical of a relationship. In FIG. 20, case 1 and case 2 do not have propagating links, whereas case 3 is of interest and has propagation edges, where a new association is created between every incoming, bidirectional and outgoing link. FIG. 20 thus depicts elimination of a node and its dangling edges.

The attributes such as name, direction, cardinality, and role names of the new association are obtained as follows:

Direction: The direction of the new edge depends on whether the dangling edges were bidirectional or directed. New edge assumes the direction of the dangling edge(s) if the dangling edges were directed; otherwise it is bidirectional.

Role name: The new edges assume the role name of the nodes that the new edge connects.

Figure 21A:
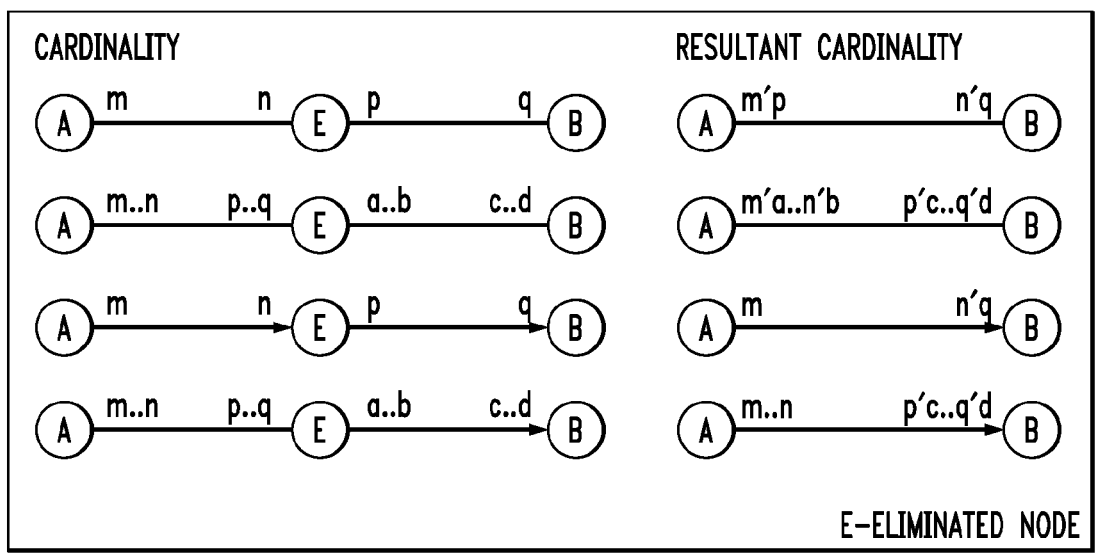
FIGS. 21A and B show cardinality constraints propagation and role names and direction propagation.
Figure 21B:
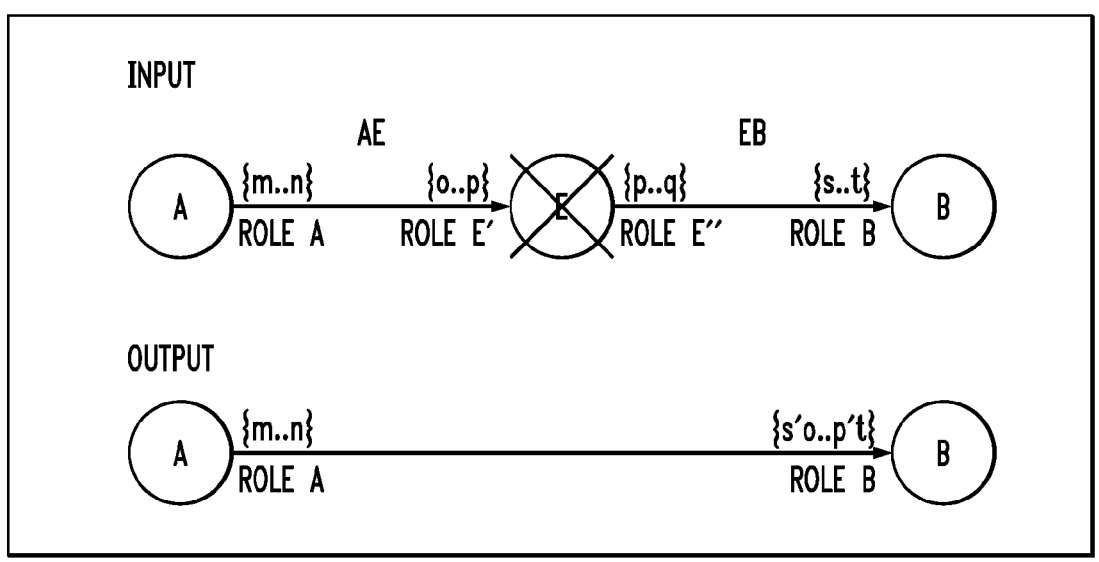

Cardinality: Cardinality of the new edge is obtained by finding the minimum and maximum number of instances of nodes that the new edge connects; can be associated through the node that is eliminated. In other words, the cardinality is calculated as the cross product of cardinality of the two links that results in propagation. FIG. 21A shows the propagation of cardinality constraints among the dangling edges. FIG. 21B shows the new edges with the properties after elimination of a node.

Extraction From Multiple Sequence Diagrams

For effective software reuse, there should be a way to combine separate services, each of which is derived from an individual generic system, to form a higher level atomic service abstraction. If this can be done, the number of service abstractions to be stored, maintained, and understood by potential users will be the total number of concepts, rather than the combinatorial product of the numbers of options for each decision. To make such an approach work, it must be possible to combine multiple services that operate toward a single goal, such as a business or enterprise goal. Higher levels of service abstraction are extracted, in one or more embodiments, by considering multiple sequence diagrams from a project and combining as many functionalities as possible into a single abstraction.

As the services are offered by the interaction of classes, ServiceExtract analyzes these interactions (usage patterns) to determine if the services are contributing to a single business logic. To provide an exemplary demonstration of ServiceExtract, consider two sequence diagrams (note, however, one or more techniques can be extended to any number of sequence diagrams).

As a first step, embodiments of the invention identify the matching classes between two sequence diagrams. If there are no matching classes among the sequence diagrams, then each sequence diagram is modeled as an independent service. However, if the two sequence diagrams have common classes, then further analysis should be performed on the pattern and usage of matching classes, to combine them into a single high level service.

Recall that a controller class performs the actual operation required to achieve the functionality. Therefore, the controller class plays an important role in determining if two services can be combined. If the common set (matching classes) does not have a matching controller class, then it can be said that the two sequence diagrams offer services which are distinctly different. In this case, the two sequence diagrams are modeled as independent services. For example, sequence diagrams shown in FIGS. 3 and 5 do not have a matching controller class. In this case, 'enroll a student for a course' and 'bill for the semester' are modeled as two different services.

Figure 4:
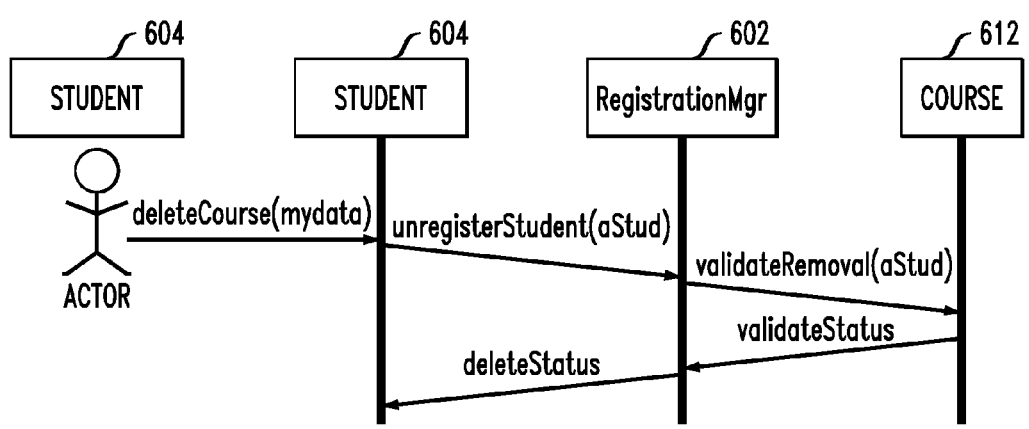

On the other hand, services can be combined if the following conditions are satisfied: (i) if the services are requested by the same boundary class, (ii) the services are provided by the same controller class, and (iii) the services use the same entity classes for storage and/or retrieval. Examples of this category are depicted in FIGS. 3 and 4. The interfaces identified in the individual sequence diagram (as interfaces of the individual services) can be combined into a high level abstraction. In this case, 'enroll a student' and 'delete a student' can be modeled as two operations of a service called "student utility."

If a subset of classes exist that match between the two sequence diagrams, then the type (pattern) of classes and the level of matching between them determines whether they can be combined. The different usage patterns and their usefulness in identifying the services are discussed further hereinbelow.

Service Consumer Usage Pattern: In a typical product usage it is likely that actors (consumers) act upon an object, such as a business or enterprise object, for obtaining a service. For example, a student (actor) would like to add, delete, register or update his or her course (business object) details. These activities are utilized by the student and can be combined into a high level abstraction. It follows that these operations are performed by a single controller class (towards a business logic). Therefore, if the boundary classes (service requester) and the controller classes (performs the operations) match between the sequence diagrams, then they can be combined. The resultant service will include interfaces exposed to the boundary class in both the sequence diagrams. The name for the service can be either manually assigned or obtained by merging the names of the two individual sequence diagrams.

An example of this category can be seen in FIGS. 3 and 4. The consumer of the service is the 'student' (actor). The controller and boundary class are the same. The interfaces exposed can be combined into a service. The table of FIG. 7 presents the output for these input sequence diagrams, with the service in a first column 902 and the operations in a second column 904.

Service Producer Usage Pattern: A service is performed by the controller classes (producer) by either obtaining data or storing data to persistent objects (entity class). If the matching classes between sequence diagrams are controller and entity classes, then the services might be related and combined into a higher level abstraction. The sequence diagrams shown in FIGS. 3 and 4 can be considered for this case. The controller class being the same in both cases (class 'RegistrationMgr' and class 'Course'), the two services can be combined. The operations of the combined service are 'enrollStudent(aStudent)' and 'unregisterStudent(aStudent).' The name for the new service is obtained by combining the names of the individual classes ('Enroll or delete a course,' in this case).

It should be noted that the sequence diagram considered in this running example falls under both service producer and service consumer usage patterns. Such inconsistencies are feasible and are addressed elsewhere herein.

Consumer-Storage Usage Pattern: The matching of the service requesting class and the persistent information class does not necessarily convey information about the relatedness of the services. The service requesting class can operate via a different controller to store or obtain information from the persistent objects. The operations performed by the controller class or raised by the boundary class might be entirely distinct. In this case, the two sequence diagrams are modeled as individual services. An example of this category is FIGS. 3 and 5. The course registration and the billing information are different logics (e.g., business or enterprise logics). The table of FIG. 8 summarizes the output using the consumer storage usage pattern for the sequence diagrams of FIGS. 3 and 5. A first column 1002 lists the sequence diagrams, a second column 1004 lists the services, and a third column 1006 lists the operations.

For all the above cases, the implementation artifacts are obtained by considering all the classes of the sequence diagrams that are to be merged. The set of relationships among these classes is directly obtained from the class diagram and is preserved as implementation artifacts for the service. If there exists no direct relationship between two classes in the class diagram, propagation of relationships (as described above) is used for pruning the relationships.

Inconsistencies

Inconsistency due to pattern mismatch: Inconsistencies might arise while categorizing the sequence diagrams by using different patterns. For example, two sequence diagrams might fall into more than one category. In such a case, the table of FIG. 9 is used to facilitate categorization. A first column 1102 lists the service consumer, service producer, and consumer-storage, which are also the headings of, respectively, columns 1104, 1106, and 1108. Column 1110 includes remarks.

Evaluation and Assessment

By way of example and not limitation, an evaluation follows, which concentrates on two aspects: (i) demonstrating that, in one or more embodiments, the extracted service abstractions are reusable and (ii) demonstrating that services abstractions obtained through ServiceExtract adhere to service requirements (demonstrating the correctness of the algorithm employed in one or more embodiments). Again, purely by way of example and not limitation, results are presented based on experiments conducted on two data sets: (a) the pedagogical student course registration and (b) data gathered from a large scale example, which data was used to conduct the aforesaid experiments.

Evaluation of Service Abstractions

Consider multiple sequence diagrams of the student registration problem and obtain the service abstractions. The table of FIG. 10 presents all the services identified from the sequence diagrams, with the service names in column 1902 and the operations in column 1904. The sequence diagrams used for the experimental demonstrations were obtained from various sources, including UML 2 Sequence Diagrams, and Analysis and Design with UML, as well as those presented in "Extraction of Service Abstractions" above.

For illustrative purposes, it will be demonstrated that the extracted service abstractions adhere to the service requirements. Typically, a Service Litmus Test (SLT) is conducted to verify whether a service satisfies the requirements. The skilled artisan will be familiar with service definition. The litmus test puts forward qualitative evaluation criteria for a service. Essentially, such tests evaluate qualitatively whether a component is stateless, discoverable, autonomous, loosely coupled, composable and abstract. The skilled artisan will be familiar with such tests. A comprehensive list of the SLT criteria and methodology can be obtained as known to the skilled artisan. For purposes of the illustrative experimentation, the evaluation for the services was obtained from a group of experts (architects). The table of FIG. 11 presents evaluation of the extracted service abstractions against these metrics. This shows that, in one or more embodiments, the identified services adhere to the service definitions. In particular, column 2002 lists SLT criteria, and columns 2004, 2006, and 2008 list, respectively, the services "CourseRegistration," "Student," and "Course."

Re-Usability Evaluation of Service Abstraction:

For exemplary purposes, consider the domain abstractions and/or services and the operations modeled by experts and/or architects for a problem. Compare these services, along with their operations, with those extracted by ServExtract. Let $A_{nserv}$ be the number of service abstractions defined by the architect and $A_{nops}^i$ be the number of service operations defined by the architect for the $i^{th}$ service abstraction. Similarly, let $E_{nserv}$ represent the service abstractions defined by the extraction algorithm and $E_{nops}^i$ represent the operations for the $i^{th}$ service abstraction. Then, reusability is measured by equation 2 below. High values of this metric indicate that the extracted abstraction can be used to replace or model the services of a problem in a similar, or the same, domain.

$$n_{servMatch} = E_{nserv} / A_{nserv} \quad (1)$$

$$n_{opMatch} = (E_{nops}^i / A_{nops}^i), \text{ for all } i \quad (2)$$

where $n_{servMatch}$ represents the service matches obtained and $n_{opMatch}$ represents the operations matched for each service.

The table of FIG. 12 gives the services modeled by two different experts for the problem defined in "Example Domain" above, and the table of FIG. 10 gives abstractions and the operations that were extracted by an exemplary algorithm, according to an aspect of the invention. In FIG. 12, columns 2102 and 2104 list service names and operations for the first architect, while columns 2106 and 2108 do the same for the second architect.

Figure 5:
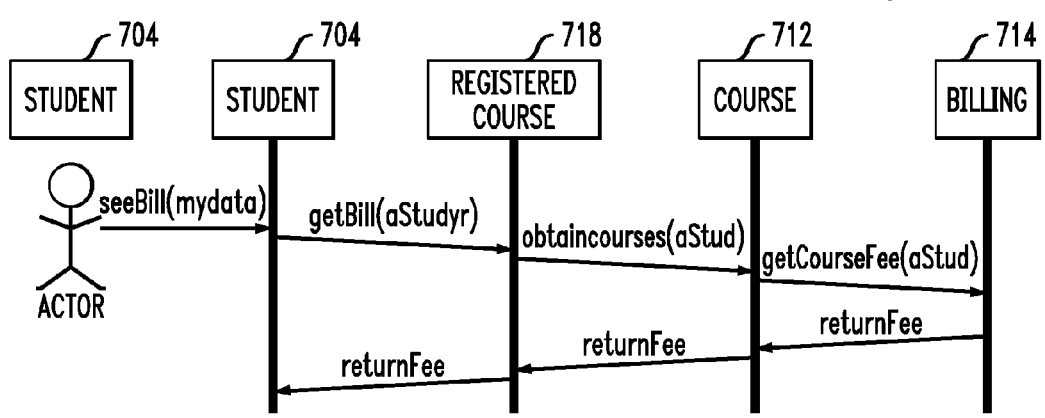

Equation 2 is used to measure the matching elements between the extracted abstraction and modeled services. The table of FIG. 13 summarizes the results. Columns 2202 and 2204 present services and operations for architect 1, while columns 2206 and 2208 present the same for architect 2. Using FIG. 13, it can be seen that the number of services that matches the extracted services in the case where Architect 1 has designed the services is 100%, and the number of services that matches the extracted services in the case where Architect 2 has designed the services is 50%. In a similar way, it can be seen that the number of matching operations for the services were as high as 50% (the lower value being 25%). It should be noted that the extracted service abstractions and the operations are dependent on the number and the functionality of the sequence diagrams. For exemplary purposes, a limited set of sequence diagrams have been used, as shown in FIGS. 3-5. The reuse factor can be as high as 100% when the entire set of sequence diagram of a problem can be obtained and used for extraction of services. The above results indicate that one or more embodiments effectively extract domain services from low level design diagrams.

Exemplary Techniques Employing Class Diagrams But Not Sequence Diagrams

Figure 14:
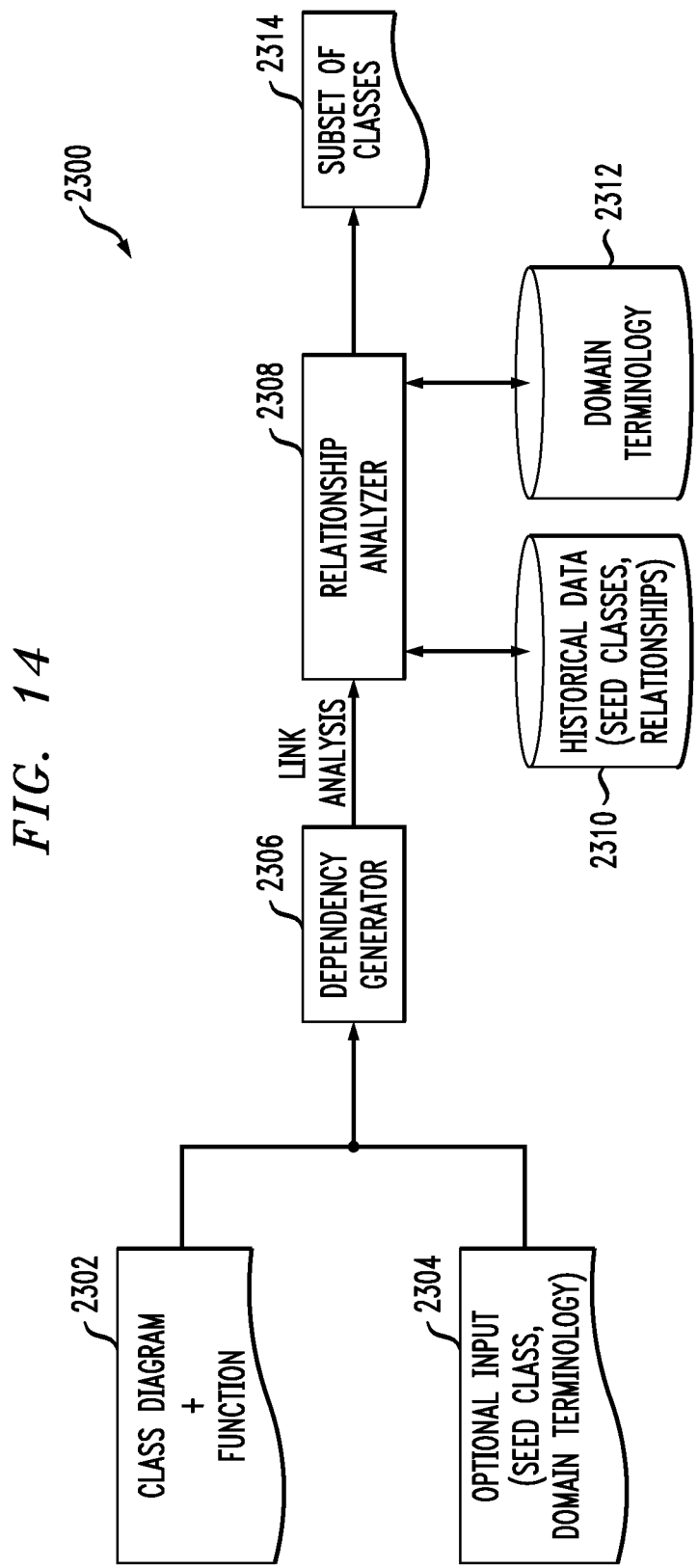
FIG. 14 shows a block diagram for an exemplary technique wherein class diagrams but not sequence diagrams are taken as inputs.

The examples presented thus far make use of sequence diagrams and corresponding class diagrams. In some instances, it may be desirable to implement techniques that employ class diagrams but not sequence diagrams. Such approaches might be particularly advantageous where sequence diagrams are not available. FIG. 14 shows an exemplary architecture 2300 useful in the case where class diagrams, but not sequence diagrams, are to be employed. Architecture 2300 also is indicative of processing and data flow.

Dependency generator 2306 generates the dependency graph using link analysis. Inputs include one or more class diagrams and associated function(s) (functions can be viewed as services), as indicated at 2302, and optionally, input such as a seed class and/or domain terminology, and the like, as indicated at block 2304. The functional requirement is also taken as input along with the class diagram. The functional requirement is specified as a set of key words representing the function. Relationship analyzer 2308 analyzes the relationships between classes to obtain the implementation artifacts for the given requirements. The resulting output is a subset of classes, as per block 2314.

By way of example, consider the functionality requirement as "authentication." Given a class diagram 2302 and knowledge that 'authentication' is a process mapped with seed class 'login,' then the traversal of the dependency graph using the 'login' class will give the required artifacts. Relationship analyzer 2308 makes use of historical data pertaining to seed classes, relationships, and the like, as shown at block 2310; analyzer 2308 also updates data 2310, as indicated by the double-headed arrow between blocks 2308 and 2310. Relationship analyzer 2308 also makes use of domain terminology, as shown at block 2312; and analyzer 2308 also updates data 2312, as indicated by the double-headed arrow between blocks 2308 and 2312.

For illustrative purposes, consider user-defined functions. In such a case, a typical problem might be the identification of artifacts that implement a user defined function, given the class diagram 2302 and optional seed class 2304. In this case, dependency analyzer 2306 constructs a dependency graph for the given class diagram. Typical rules are as follows:

Unidirectional links using links to unidirectional edge
Bidirectional using links to bidirectional edges
Classes are treated as nodes
Inheritance and/or association to dependency edges (special edges).

Relationship analyzer 2308 uses the graph to determine the artifacts, given some knowledge. Typical rules include obtaining the seed classes, by using, for example, domain expertise. The system follows the dependency paths and includes all classes that are dependent for a given functionality. In one or more embodiments, for each class included, if there are inheritance links, all parents of the inherited link have to be added, and all parents for the association link (if any are included) are added to the resultant graph.

In the above case, a simple dependency analyzer that follows the links and includes all classes along the path up to termination of the path is used for identifying implementation artifacts. In some cases the relationship analyzer can employ advanced mechanisms like calculation of fan-out and fan-in of classes to determine its functionality. The fan-in and fan-out of classes can be used to determine whether the class represents entity classes (real world domain classes) or boundary classes (that are used for interaction with the system) and controller classes (that achieve the functionality of a service). Once the classes are classified into the existing category(ies), further categorization using external sources can be carried out. By way of further illustration, consider three-tier decomposition. In this case, a typical problem is to identify the user interface (UI) (boundary), business (controller) and data (entity) classes, given the class diagram. A further classification can be used to map these set of classes (UI, business and data classes) to the 'MVC' paradigm of the OOD approach. MVC is the Model View Controller concept where the classes in the class diagram either represents the model/view/control classes. OOD is a short form of Object Oriented Design where the design of the software solution follows the object orientation principles. In this case, dependency generator 2306 constructs a dependency graph for the given class diagram, while relationship analyzer 2308 may employ 'fanout' as a performance metric. 'Fanout' defines the ratio of the incoming to the outgoing calls:

$$\text{Fanout} = \text{Incoming link/outgoing link} \quad (3)$$

Advantageously, a bottom-up approach can be employed. The system identifies the class roles by using the relationships between classes, using the fanout concept. Entity classes are storage and/or persistent elements. These classes often receive messages, since messages are often directed to the storage elements. Therefore, for these classes, fanout is greater than one. Boundary classes raise requests. These classes raise the messages to other classes. Therefore, for these classes, fanout is less than one. Controller classes mediate the requests. Due to mediating the requests between other classes, for every query that is raised there will be a response. Therefore, for these classes, fanout is approximately equal to one. Such patterns and definitions can be used to automatically classify the usage category of the classes.

With reference to FIG. 2, for the entity class "student" 204, there is one incoming link and there are no outgoing links; accordingly, the incoming link dominates the ratio. For the entity class "billing" 214, there are two incoming links and no outgoing links, so once again, the ratio is dominated by incoming links. Controller classes include the registration manager 202, which has two incoming links (including a bi-directional link) and three outgoing links. There are some classes that are not detected; for example, "course," etc., does not follow the rule. This type of behavior may indicate, in at least some instances, that the class diagram might not have been modeled appropriately.

Figure 15A:
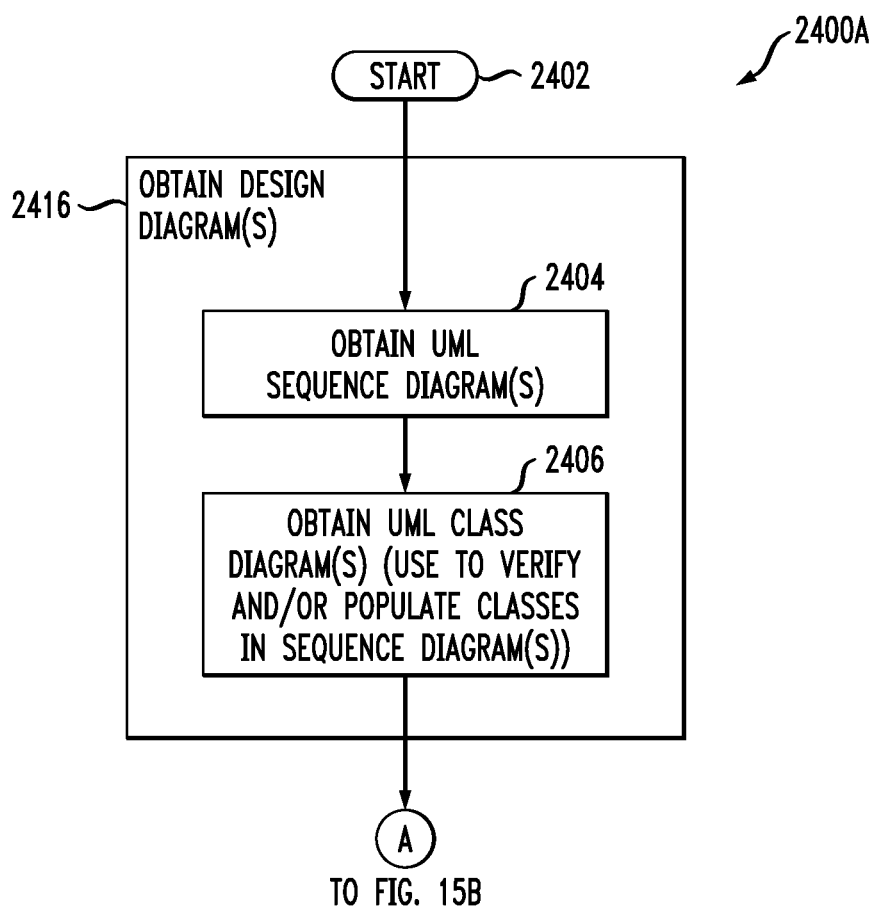
FIGS. 15A and B present a flow chart of exemplary method steps for a method using class diagrams and sequence diagrams as inputs.
Figure 15B:
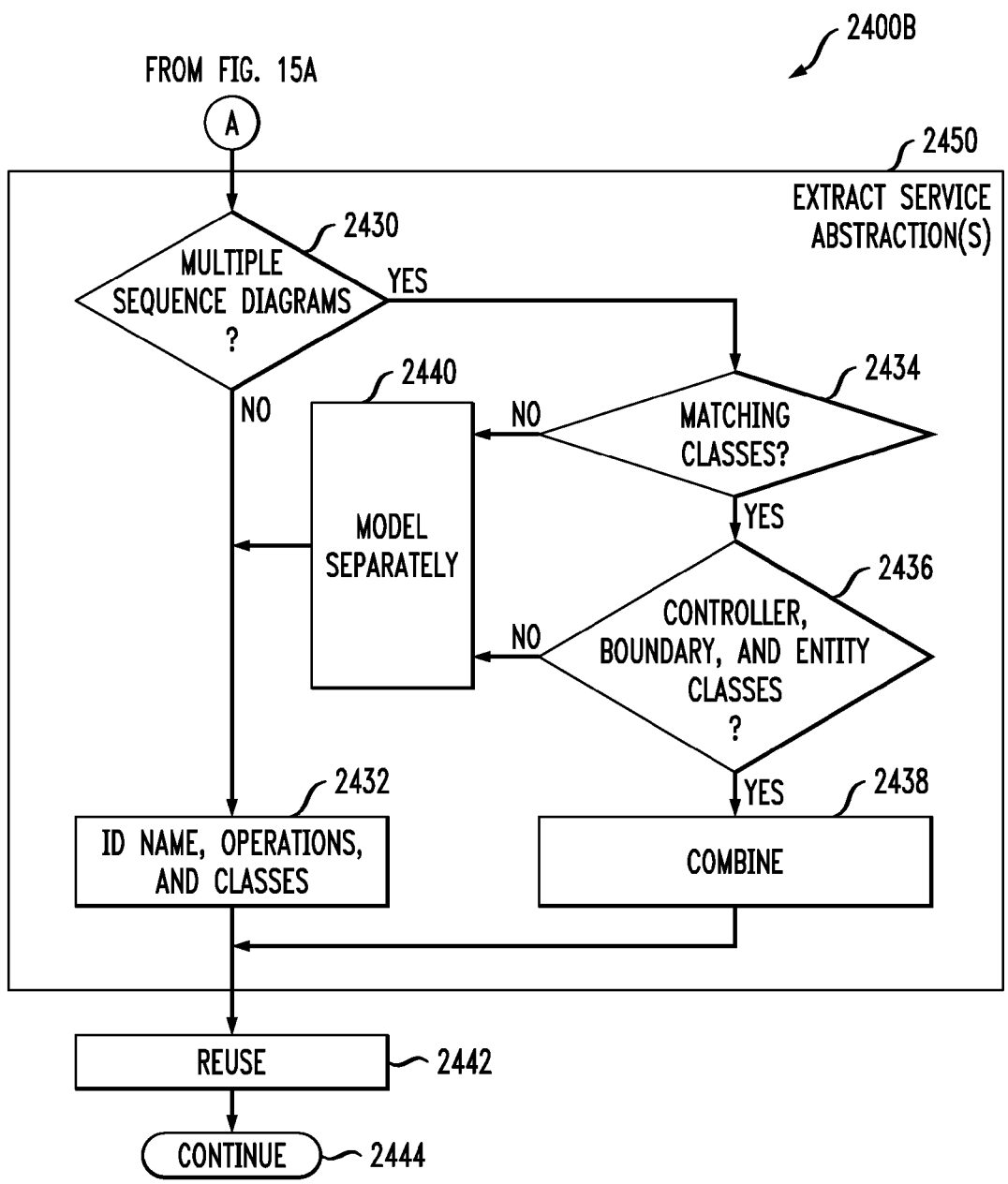

In view of the discussion of FIGS. 1-13, and with reference now to FIGS. 15A and 15B, it will be appreciated that, in general terms, an exemplary method 2400, after beginning at step 2402, includes the step 2416 of obtaining at least one design diagram from at least one previous software project. Step 2450 includes extracting, from the at least one design diagram, at least one service abstraction. Step 2442 includes reusing the at least one service abstraction in a new software project. Processing continues at block 2444. Method 2400 is broken into flow chart 2400A in FIGS. 15A and 2400B in FIG. 15B.

In one or more instances, the at least one design diagram includes one or more unified modeling language sequence diagrams and one or more unified modeling language class diagrams from the at least one previous software project, as per sub-steps 2404 and 2406. Step 2420 may then include extracting the at least one domain ontology from the sequence diagram and the class diagram, and step 250 may then include extracting the at least one service abstraction from the sequence diagram.

Block 2430 includes determining whether there are multiple sequence diagrams. If such is not the case, as per the NO branch, the step of extracting the at least one service abstraction will include extracting same from only the single sequence diagram. Such extraction can include, as indicated at block 2432, identifying a name of the sequence diagram as a name of the service to be extracted, identifying operations of the service to be extracted by examining interfaces between the service and boundary classes of the sequence diagram, and identifying implementation classes of the sequence diagram used for implementing the service, so as to obtain a service object. The service object characterizes the service to be extracted and includes the operations and the implementation classes.

If there are multiple sequence diagrams, as per the YES branch of block 2430, the step of extracting the at least one service abstraction will include extracting from at least first and second sequence diagrams; this, in turn, can include determining whether matching classes exist between the first and second sequence diagrams, as at block 2434. If such is not the case, as per the NO branch, the sequence diagrams are modeled separately, as indicated at block 2440; for example, by executing block 2432 on each diagram. If there are matching classes, as per the YES branch of block 2434, in block 2436, a determination is made whether the first and second sequence diagrams can be combined to form a single high level service; if such is the case, as per the YES branch, they are combined in block 2438; while if such is not the case, as per the NO branch, the sequence diagrams are modeled separately, as indicated at block 2440; for example, by executing block 2432 on each diagram. Block 2436 can include, for example, determining whether the matching classes include a matching controller class, as well as, for example, determining whether the first and second sequence diagrams represent services which are requested by the same boundary class and use the same entity class for storage and retrieval.

As shown at block 2406, in at least some instances, one or more unified modeling language class diagrams are obtained from the previous software project. They may be used, for example, to verify and/or populate classes in one or more sequence diagrams. Typically, the class diagrams include the stereotyped classes. These stereotypes can be used to populate the class types in a sequence diagram, and in case the stereotype exists, it is used to verify the correctness. That is, if the stereotyped classes are also present in the sequence diagram, correctness of the stereotyped classes in the sequence diagram is verified by using the unified modeling language class diagram, while if the stereotyped classes are not also present in the sequence diagram, classes in the sequence diagram are populated using the unified modeling language class diagram.

Figure 16:
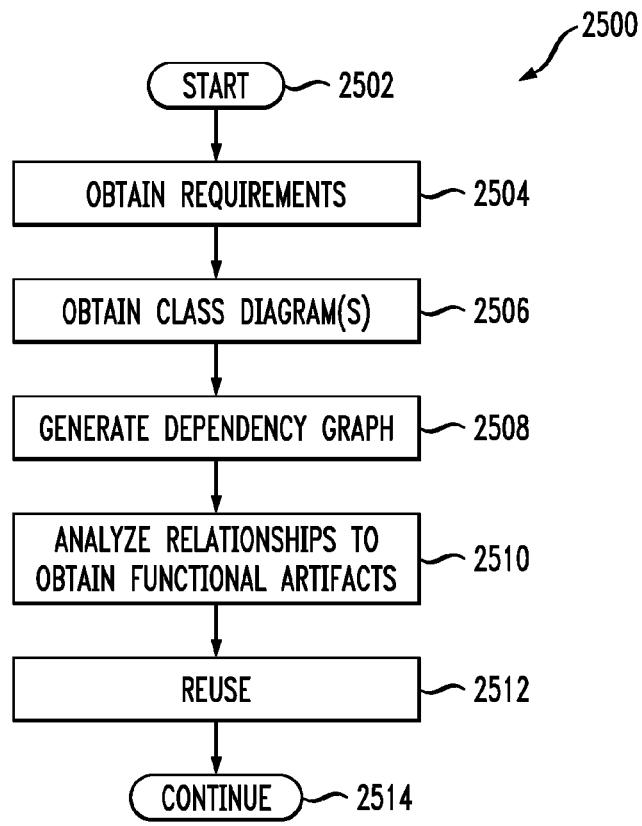
FIG. 16 presents a flow chart of exemplary method steps for a method using class diagrams but not sequence diagrams as inputs.

In view of the discussion of FIG. 14, and with reference now to FIG. 16, it will be appreciated that, in general terms, an exemplary method 2500, after beginning at step 2502, includes the step 2504 of obtaining requirements for a current software project. Step 2506 includes obtaining at least one class diagram from at least one previous software project, while step 2508 includes generating a dependency graph from the at least one design diagram, using link analysis. Step 2510 includes analyzing relationships between classes in the dependency graph to obtain functional artifacts for the requirements; and step 2512 includes reusing the functional artifacts in the new software project. Processing continues at block 2514.

In some instances, with reference to FIG. 18, the step 2508 of generating the dependency graph includes treating classes in the class diagram as nodes and the links are interpreted using the following rules:

If a directional link exists, then the link is preserved as unidirectional.

If bidirectional links exist, then they are preserved as bidirectional links

Inheritance and/or association to dependency edges are considered as special edges and are preserved as is.

To summarize, if there is a unidirectional edge in the class diagram between two classes, insert a unidirectional edge on the corresponding nodes in the dependency graph. Similarly, insert a bidirectional edge for a bidirectional link between classes. Inheritance and/or associations between classes are modeled as special edges in the dependency graph. Completion of these three steps will lead to the generation of a dependency graph. Thus, as seen in FIG. 18, in one or more instances, the step of generating the dependency graph includes, as seen at block 2702, treating classes in the class diagram as nodes. As per block 2704, an additional step includes determining whether there is a unidirectional edge, in the class diagram, between two of the classes. In block 2706, responsive to determining that there is a unidirectional edge, in the class diagram, between two of the classes, the system inserts a unidirectional edge on corresponding nodes in the dependency graph. In block 2708, the system determines whether there is a bidirectional link, in the class diagram, between two of the classes; and in step 2710, responsive to determining that there is a bidirectional link, in the class diagram, between two of the classes, the system inserts a bidirectional edge on corresponding nodes in the dependency graph. Step 2712 includes modeling at least one of inheritances and associations between the classes in the class diagram as special edges in the dependency graph. In some instances, steps may be performed by, or with the aid of, human intervention, instead of or in addition to performance by a computer system.

Furthermore, in some instances, with reference to FIG. 19, the step 2510 of analyzing the relationships includes obtaining a plurality of seed classes, following dependency paths in the dependency graph to identify all of the classes which are dependent for a given functionality; and employing the following rules to obtain the implementation artifacts of the required functionality.

Rules:

Obtain the seed classes, using, for example, domain expertise. The seed classes are those classes that are related and/or required for the functionality. Typically, these classes are obtained from domain experts, who provide a list of classes that can implement a functionality. The actual class diagram(s) from one or more previous projects can be included in either all or a subset of these seed classes. To extract implementation classes for a functionality, for each of the seed classes, follow the dependency paths and include all classes that are dependent. In one or more embodiments, for each class included, if there are inheritance links, all parents of the inherited link have to be added and all parents for the association link (if any included) are added to the resultant graph. The classes that have been obtained following the dependency classes and all the classes related to these dependent classes, either through inheritance or through containment, are all part of the implementation artifact for a given functionality (specified in terms of seed class).

To summarize: obtain seed classes from domain expertise. Seed classes become the starting point for traversing the dependency graph. Follow dependency paths in the dependency graph to identify all of the classes which are dependent for a given functionality (these classes are the classes in the class diagram). If a seed class is input, start from that class and include all classes in the graph which are dependent on that initial class for a given functionality. In one or more embodiments, for each class included, if there are inheritance links, all parents of the inherited link have to be added and all parents for the association link (if any included) are added to the resultant graph. The output of traversing this dependency graph is a functional artifact which can be reused in a new software project. A non-limiting example of a functional artifact is the implementation classes for a given functionality.

Thus, as seen in FIG. 19, in one or more instances, the step of analyzing the relationships includes, as shown at block 2802, obtaining a plurality of seed classes, based on domain expertise; and, as shown at block 2804, beginning with the seed classes, following dependency paths in the dependency graph to identify all of the classes in the class diagram which are dependent for a given functionality, to obtain the functional artifacts.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 17:
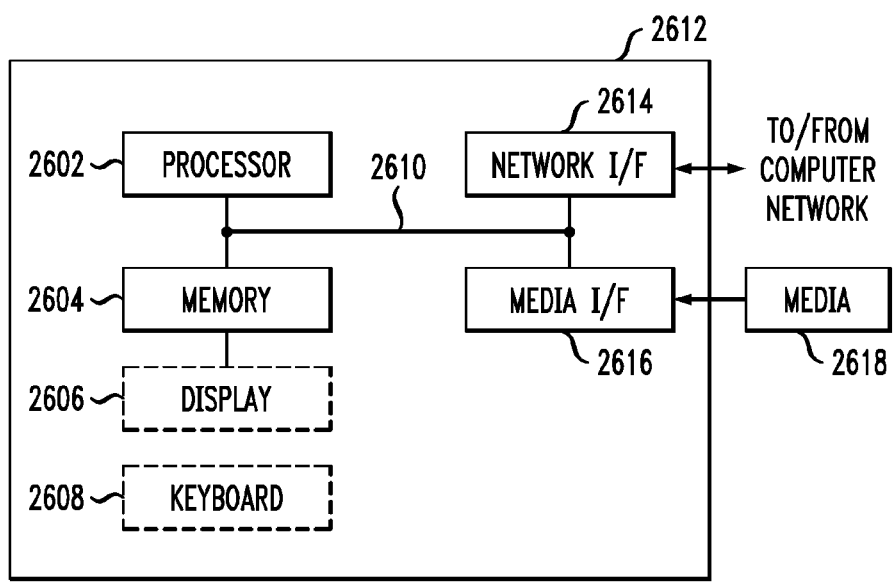
FIG. 17 depicts a computer system that may be useful in implementing one or more aspects and/or elements of the present invention.

One or more embodiments can make use of software running on a general purpose computer or workstation. With reference to FIG. 17, such an implementation might employ, for example, a processor 2602, a memory 2604, and an input/output interface formed, for example, by a display 2606 and a keyboard 2608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2602, memory 2604, and input/output interface such as display 2606 and keyboard 2608 can be interconnected, for example, via bus 2610 as part of a data processing unit 2612. Suitable interconnections, for example via bus 2610, can also be provided to a network interface 2614, such as a network card, which can be provided to interface with a computer network, and to a media interface

2616, such as a diskette or CD-ROM drive, which can be provided to interface with media 2618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 2618) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 2604), magnetic tape, a removable computer diskette (for example media 2618), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 2602 coupled directly or indirectly to memory elements 2604 through a system bus 2610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 2608, displays 2606, pointing devices, and the like) can be coupled to the system either directly (such as via bus 2610) or through intervening I/O controllers (omitted for clarity).

Network adapters such as network interface 2614 may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:

obtaining at least one design diagram from at least one previous software project, wherein said obtaining is carried out via a software module executing on a hardware processor;

extracting, from said at least one design diagram, a domain and at least one service abstraction for implementing a certain function, wherein said extracting is carried out via a software module executing on a hardware processor, and wherein said extracting comprises:

identifying the name for a candidate service abstraction;

obtaining one or more interfaces for the candidate service abstraction; and obtaining one or more implementation artifacts for the candidate service abstraction, wherein the one or more implementation artifacts represent the one or more classes that participate in implementing the certain function;

verifying that the candidate service abstraction adheres to one or more service requirements; and reusing the verified candidate service abstraction in a subsequent software project, wherein said reusing is carried out via a software module executing on a hardware processor, and wherein said reusing comprises (i) measuring a number of matching operations between the verified candidate service abstraction and the subsequent software project, $n_{opMatch}$, via $n_{opMatch}=(E_{nops}^i/A_{nops}^i)$, wherein $A_{nops}^i$ represents the number of service operations pre-defined for the verified candidate service abstraction i and $E_{nops}^i$ represents the operations for the verified candidate service abstraction i derived from said extracting step, and (ii) reusing the verified candidate service abstraction in the subsequent software project if the number of matching operations exceeds a predetermined reuse factor.

2. The method of claim 1, wherein said at least one design diagram comprises a unified modeling language sequence diagram, and wherein said step of extracting said at least one service abstraction comprises extracting said at least one service abstraction from said sequence diagram.

3. The method of claim 2, wherein said step of extracting said at least one service abstraction comprises extracting from only said sequence diagram.

4. The method of claim 3, wherein said extracting from only said sequence diagram comprises:

identifying a name of said sequence diagram as a name of said service to be extracted;

identifying operations of said service to be extracted by examining interfaces between said service and boundary classes of said sequence diagram; and identifying implementation classes of said sequence diagram used for implementing said service;

so as to obtain a service object, characterizing said service to be extracted, and comprising said operations and said implementation classes.

5. The method of claim 2, wherein:

said unified modeling language sequence diagram comprises a first unified modeling language sequence diagram;

said at least one design diagram further comprises a second unified modeling language sequence diagram; and said step of extracting said at least one service abstraction comprises extracting from at least said first and second sequence diagrams.

6. The method of claim 5, wherein said extracting from said at least said first and second sequence diagrams comprises:

determining whether matching classes exist between said first and second sequence diagrams; and responsive to determining that said matching classes do not exist between said first and second sequence diagrams, modeling said first and second sequence diagrams separately.

7. The method of claim 5, wherein said extracting from said at least said first and second sequence diagrams comprises:

determining whether matching classes exist between said first and second sequence diagrams; and responsive to determining that said matching classes do exist between said first and second sequence diagrams, determining whether said first and second sequence diagrams can be combined to form a single high level service.

8. The method of claim 7, wherein said determining whether said first and second sequence diagrams can be combined comprises at least determining whether said matching classes include a matching controller class.

9. The method of claim 8, wherein said determining whether said first and second sequence diagrams can be combined further comprises determining whether said first and second sequence diagrams represent services which are requested by a same boundary class and use a same entity class for storage and retrieval.

10. The method of claim 2, further comprising:

obtaining a unified modeling language class diagram from said at least one previous software project, said class diagram including stereotyped classes;

if said stereotyped classes are also present in said sequence diagram, verifying correctness of said stereotyped classes in said sequence diagram using said unified modeling language class diagram; and if said stereotyped classes are not also present in said sequence diagram, populating classes in said sequence diagram using said unified modeling language class diagram.

11. A method comprising the steps of:

obtaining requirements for a current software project;

obtaining at least one class diagram from at least one previous software project;

generating a dependency graph from said at least one class diagram, using link analysis, wherein said generating comprises:

treating classes in said class diagram as nodes;

determining whether there is a unidirectional edge, in said class diagram, between two of said classes;

responsive to determining that there is a unidirectional edge, in said class diagram, between two of said classes, inserting a unidirectional edge on corresponding nodes in said dependency graph;

determining whether there is a bidirectional link, in said class diagram, between two of said classes;

responsive to determining that there is a bidirectional link, in said class diagram, between two of said classes, inserting a bidirectional edge on corresponding nodes in said dependency graph; and modeling at least one of inheritances and associations between said classes in said class diagram as special edges in said dependency graph;

analyzing relationships between classes in said dependency graph to obtain functional artifacts for said requirements, via:
- obtaining a plurality of seed classes, based on domain expertise; and
- beginning with said seed classes, following dependency paths in said dependency graph to identify all of said classes in said class diagram which are dependent for a given functionality, to obtain said functional artifacts; and
- for each identified class which is dependent for the given functionality, adding (i) each parent of each of one or more inheritance links corresponding thereto and (ii) each parent of each of one or more association links corresponding thereto to said dependency graph; and reusing said functional artifacts in said current software project.

12. The method of claim 11, wherein at least one of said functional artifacts comprises implementation classes for a given functionality.

13. A computer program product comprising a non-transitory tangible computer useable storage medium including computer usable program code, said computer program product including:
- computer usable program code for obtaining requirements for a current software project;
- computer usable program code for obtaining at least one class diagram from at least one previous software project;
- computer usable program code for generating a dependency graph from said at least one class diagram, using link analysis, wherein said generating comprises:
  - treating classes in said class diagram as nodes;
  - determining whether there is a unidirectional edge, in said class diagram, between two of said classes;
  - responsive to determining that there is a unidirectional edge, in said class diagram, between two of said classes, inserting a unidirectional edge on corresponding nodes in said dependency graph;
  - determining whether there is a bidirectional link, in said class diagram, between two of said classes;
  - responsive to determining that there is a bidirectional link, in said class diagram, between two of said classes, inserting a bidirectional edge on corresponding nodes in said dependency graph; and
  - modeling at least one of inheritances and associations between said classes in said class diagram as special edges in said dependency graph;
- computer usable program code for analyzing relationships between classes in said dependency graph to obtain functional artifacts for said requirements, via:
  - obtaining a plurality of seed classes, based on domain expertise; and
  - beginning with said seed classes, following dependency paths in said dependency graph to identify all of said classes in said class diagram which are dependent for a given functionality, to obtain said functional artifacts; and
  - for each identified class which is dependent for the given functionality, adding (i) each parent of each of one or more inheritance links corresponding thereto and (ii) each parent of each of one or more association links corresponding thereto to said dependency graph; and
- computer usable program code for reusing said functional artifacts in said current software project.

14. The computer program product of claim 13, wherein at least one of said functional artifacts comprises implementation classes for a given functionality.

15. A computer program product comprising a non-transitory tangible computer useable storage medium including computer usable program code, said computer program product including:
- computer usable program code for obtaining at least one design diagram from at least one previous software project;
- computer usable program code for extracting, from said at least one design diagram, a domain and at least one service abstraction for implementing a certain function, wherein said extracting comprises:
  - identifying the name for a candidate service abstraction;
  - obtaining one or more interfaces for the candidate service abstraction; and
  - obtaining one or more implementation artifacts for the candidate service abstraction, wherein the one or more implementation artifacts represent the one or more classes that participate in implementing the certain function;
- computer useable program code for verifying that the candidate service abstraction adheres to one or more service requirements; and
- computer usable program code for reusing the verified candidate service abstraction in a subsequent software project, wherein said reusing comprises (i) measuring a number of matching operations between the verified candidate service abstraction and the subsequent software project, $n_{opMatch}$, via $n_{opMatch}=(E_{nops}^{i}/A_{nops}^{i})$, wherein $A_{nops}^{i}$ represents the number of service operations pre-defined for the verified candidate service abstraction i and $E_{nops}^{i}$ represents the operations for the verified candidate service abstraction i derived from said extracting step, and (ii) reusing the verified candidate service abstraction in the subsequent software project if the number of matching operations exceeds a predetermined reuse factor.

16. The computer program product of claim 15, wherein said at least one design diagram comprises a unified modeling language sequence diagram, and wherein said computer usable program code for extracting said at least one service abstraction comprises computer usable program code for extracting said at least one service abstraction from said sequence diagram.

17. The computer program product of claim 16, wherein said computer usable program code for extracting said at least one service abstraction comprises computer usable program code for extracting from only said sequence diagram.

18. The computer program product of claim 17, wherein said computer usable program code for extracting from only said sequence diagram comprises:
- computer usable program code for identifying a name of said sequence diagram as a name of said service to be extracted;
- computer usable program code for identifying operations of said service to be extracted by examining interfaces between said service and boundary classes of said sequence diagram; and
- computer usable program code for identifying implementation classes of said sequence diagram used for implementing said service;
- so as to obtain a service object, characterizing said service to be extracted, and comprising said operations and said implementation classes.

19. The computer program product of claim 16, wherein:
said unified modeling language sequence diagram comprises a first unified modeling language sequence diagram;
said at least one design diagram further comprises a second unified modeling language sequence diagram; and
said computer usable program code for extracting said at least one service abstraction comprises extracting from at least said first and second sequence diagrams.

20. The computer program product of claim 16, further comprising:
computer usable program code for obtaining a unified modeling language class diagram from said at least one previous software project; and
computer usable program code for using said unified modeling language class diagram to perform at least one of verifying and populating classes in said sequence diagram.

\* \* \* \* \*